(12) United States Patent
Hewavithana et al.

(10) Patent No.: US 10,171,272 B2
(45) Date of Patent: Jan. 1, 2019

(54) COMPUTATIONALLY EFFICIENT ALGORITHM FOR MITIGATING PHASE NOISE IN OFDM RECEIVERS

(71) Applicant: Intel Corporation, Santa Clara, CA (US)

(72) Inventors: Thushara Hewavithana, Hatfield (GB); Bernard Arambepola, Enfield (GB)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/639,196

(22) Filed: Jun. 30, 2017

(65) Prior Publication Data

US 2018/0316523 A1 Nov. 1, 2018

Related U.S. Application Data

(60) Provisional application No. 62/491,297, filed on Apr. 28, 2017.

(51) Int. Cl.
*H04L 25/02* (2006.01)
*H04L 25/03* (2006.01)
*H04L 27/26* (2006.01)

(52) U.S. Cl.
CPC ........ *H04L 25/03821* (2013.01); *H04L 25/02* (2013.01); *H04L 25/03292* (2013.01); *H04L 25/0216* (2013.01); *H04L 27/2607* (2013.01); *H04L 27/2647* (2013.01)

(58) Field of Classification Search
CPC ................. H04L 25/03; H04L 25/02
See application file for complete search history.

(56) References Cited

U.S. PATENT DOCUMENTS 8,335,284 B1 * 12/2012 Lee ............... H04L 25/0204
375/260
2008/0219371 A1 * 9/2008 Hong ............... H04L 25/022
375/260

(Continued)

FOREIGN PATENT DOCUMENTS

EP 2328310 A1 6/2011

OTHER PUBLICATIONS

"Phase Noise." www.wikipedia.com. 4 pages, 2016.

(Continued)

*Primary Examiner* — Jaison Joseph
(74) *Attorney, Agent, or Firm* — Eschweiler & Potashnik, LLC

(57) ABSTRACT

An inter-carrier interference (ICI) mitigation circuit associated with an orthogonal frequency division multiplexing (OFDM) receiver is disclosed. The ICI mitigation circuit comprises an ICI cancellation circuit configured to receive an OFDM symbol associated with an OFDM signal and determine an ICI associated with one or more OFDM subcarriers within the OFDM symbol. The ICI cancellation circuit is further configured to cancel the ICI from the one or more OFDM subcarriers associated with the OFDM symbol, in order to generate a desired OFDM symbol. In some embodiments, the ICI is determined and cancelled at the ICI cancellation circuit, in accordance with a predetermined ICI mitigation algorithm.

23 Claims, 6 Drawing Sheets

(56) References Cited

U.S. PATENT DOCUMENTS

| | | | |
|---|---|---|---|
| 2010/0315940 A1* | 12/2010 | Chen | H04J 11/0063 370/210 |
| 2014/0169434 A1 | 6/2014 | Hewavithana et al. | |
| 2014/0205030 A1* | 7/2014 | Lee | H04L 25/03821 375/260 |
| 2015/0155961 A1* | 6/2015 | Khoryaev | H04L 1/0071 375/296 |

OTHER PUBLICATIONS

Extended European Search Report dated Sep. 7, 2018 for EP Application No. 18161831.5.

Munier, Florent, et al. "An ICI Reduction Scheme for OFDM System with Phase Noise over Fading Channels." IEEE Transactions on Communications, vol. 56, No. 7, Jul. 2008. 8 pages.

* cited by examiner

COMPUTATIONALLY EFFICIENT ALGORITHM FOR MITIGATING PHASE NOISE IN OFDM RECEIVERS

REFERENCE TO RELATED APPLICATIONS

This application claims the benefit of provisional Application No. 62/491,297, filed Apr. 28, 2017, entitled "COMPUTATIONALLY EFFICIENT ALGORITHM FOR MITIGATING PHASE NOISE IN OFDM RECEIVERS", the contents of which are herein incorporated by reference in their entirety.

FIELD

The present disclosure relates to the field of orthogonal frequency division multiplexing (OFDM) receivers, and in particular to a method and an apparatus for mitigating phase noise in OFDM receivers.

BACKGROUND

Phase noise is the frequency domain representation of rapid, short-term, random fluctuations in the phase of a waveform, caused by time domain instabilities. Phase noise mitigation in conventional OFDM receivers is achieved using per symbol phase correction (known as common phase error or CPE), which is the cancellation of the phase offset common to all sub-carriers. The CPE only accounts for the symbol to symbol variation in phase due to phase noise. Phase noise variation within an OFDM symbol is not corrected by CPE. This residual phase noise introduces interference between OFDM subcarriers within each symbol, i.e. inter-carrier-interference or ICI. ICI is neither Gaussian nor white and generally has a worse impact on OFDM performance, in terms of achievable bit or frame error rates, compared to equivalent power level additive white Gaussian noise (AWGN). ICI, if not mitigated, gets added to existing AWGN noise level in OFDM signal. Hence, the ICI place an upper bound on achievable signal to noise ratio (SNR) and also makes the OFDM performance slightly worse than predicted for measured SNR. This prevents the reception of high order quadrature amplitude modulation (QAM) like QAM-16384 in OFDM receivers.

BRIEF DESCRIPTION OF THE DRAWINGS

Some examples of circuits, apparatuses and/or methods will be described in the following by way of example only. In this context, reference will be made to the accompanying Figures.

DETAILED DESCRIPTION

Figure 1:
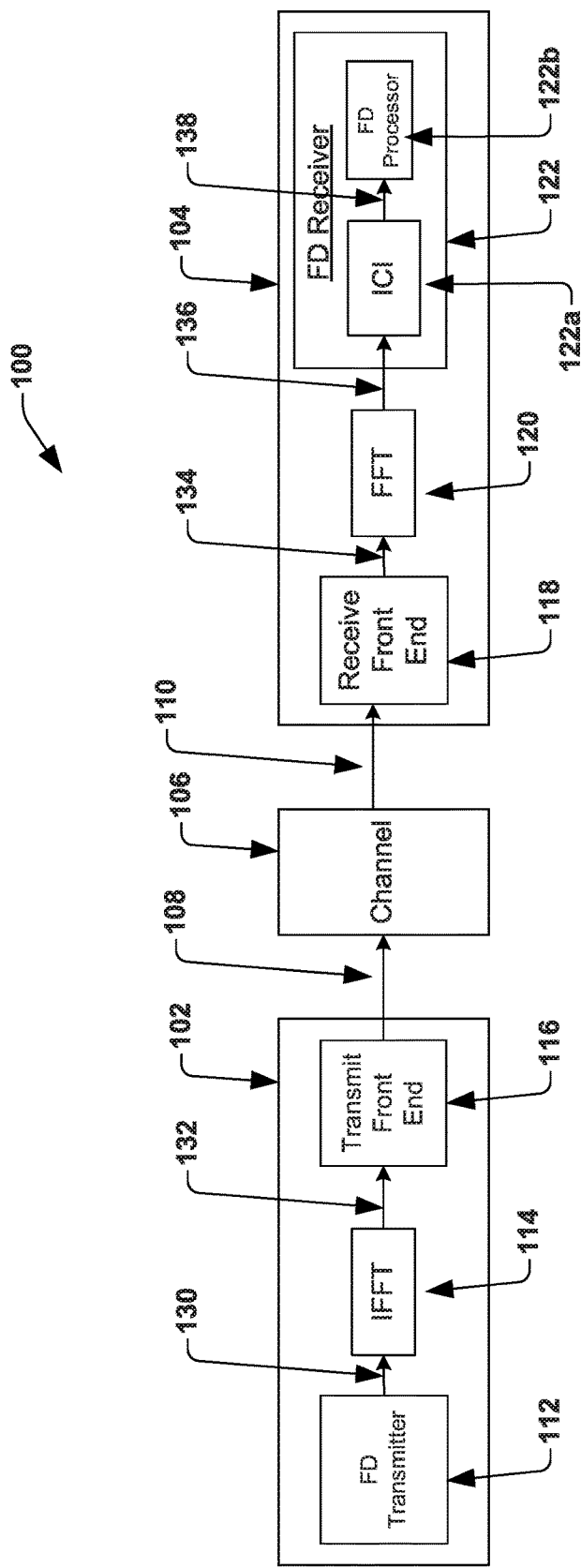
FIG. 1 depicts a simplified block diagram of an orthogonal frequency division multiplexing (OFDM) system, according to one embodiment of the disclosure.

In one embodiment of the disclosure, an inter-carrier interference (ICI) mitigation circuit associated with an orthogonal frequency division multiplexing (OFDM) receiver, comprising an ICI cancellation circuit is disclosed. In some embodiments, the ICI cancellation circuit is configured to receive an OFDM symbol associated with an OFDM signal and determine an ICI associated with one or more OFDM subcarriers within the OFDM symbol. In some embodiments, the ICI cancellation circuit is further configured to cancel the ICI from the one or more OFDM subcarriers associated with the OFDM symbol, in order to generate a desired OFDM symbol. In some embodiments, the ICI is determined and cancelled at the ICI cancellation circuit, in accordance with a predetermined ICI mitigation algorithm.

In one embodiment of the disclosure, an inter-carrier interference (ICI) cancellation circuit associated with an orthogonal frequency division multiplexing (OFDM) receiver is disclosed. In some embodiments, the ICI cancellation circuit is configured to receive an OFDM symbol associated with an OFDM signal and determine an ICI associated with one or more OFDM subcarriers within the OFDM symbol. Further, in some embodiments, the ICI cancellation circuit is configured to cancel the ICI from the one or more OFDM subcarriers associated with the OFDM symbol, in order to generate a desired OFDM symbol. In some embodiments, the ICI is determined and cancelled at the ICI cancellation circuit, in accordance with a predetermined ICI mitigation algorithm.

In one embodiment of the disclosure, a method for cancelling an inter-carrier interference (ICI) in an orthogonal frequency division multiplexing (OFDM) receiver is disclosed. The method comprises receiving, at an ICI cancellation circuit, an OFDM symbol associated with an OFDM signal and determining, at the ICI cancellation circuit, an ICI associated with one or more OFDM subcarriers within the OFDM symbol. The method further comprises cancelling, at the ICI cancellation circuit, the ICI from the one or more OFDM subcarriers associated with the OFDM symbol, in order to generate a desired OFDM symbol. In some embodiments, the ICI is determined and cancelled at the ICI cancellation circuit, in accordance with a predetermined ICI mitigation algorithm.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," "circuit" and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a user equipment (e.g., mobile phone, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from conte8, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from conte8 to be directed to a singular form. Furthermore, to the event that the terms "including", "includes", "having", "has", "with", or variants thereof are used in either the detailed description and the claims, such terms are intended to be inclusive in a manner similar to the term "comprising."

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail.

As indicated above, phase noise variation within an OFDM symbol introduces interference between OFDM subcarriers within each symbol, i.e. inter-carrier-interference or ICI. ICI has an additive non-white non-Gaussian noise like characteristic and prevents the reception of high order QAM like QAM-16384 in OFDM receivers. Hybrid fibre-coax (HFC) cable modems worldwide are based on the Docsis standard. Current Docsis (3.1) standard is based on OFDM and supports QAM constellations up to 16384. Current implementations of cable modems support only up to QAM-4096, but next generation cable modems will be required to include the higher order constellations. It is impractical to do this (especially QAM-16384) with the current phase noise mitigation algorithms because phase noise limits the noise floor of the system.

In order to overcome the phase noise related issues, i.e., the ICI, a new computationally efficient algorithm (i.e., an ICI mitigation algorithm) for mitigating phase noise is proposed in this disclosure. In particular, an apparatus and a method that utilizes the proposed algorithm for mitigating phase noise in OFDM communication systems, is disclosed herein. In some embodiments, the new ICI mitigation algorithm enables to cancel out the inter-carrier-interference (ICI) within OFDM symbols in OFDM receivers. In some embodiments, the proposed algorithm utilizes a Taylor series expansion of phase noise and the coefficients of the power series are estimated using the pilot subcarriers of the transmission (that are actually intended for receiver frequency and timing synchronization), which is later utilized for cancelling out the inter-carrier-interference that occurs due to phase noise.

Although developed for HFC cable modems, the ideas are general and are applicable to the physical layer of any OFDM communication system. Furthermore, in some embodiments, the ICI mitigation algorithm proposed herein can be utilized to mitigate phase noise in moderate order QAM with low-cost tuners with poorer phase noise profiles. Alternatively, one can operate the tuner with lower power, which will result in a worsening of phase noise, which in turn can be mitigated digitally using this algorithm. In some embodiments, the ICI mitigation algorithm proposed herein enables to reduce the cost and power consumption of analog front ends. In some embodiments, the proposed algorithm enables to support higher order QAM in next generation cable modems (CM) and is computationally efficient.

FIG. 1 depicts a simplified block diagram of an orthogonal frequency division multiplexing (OFDM) system 100, according to one embodiment of the disclosure. The OFDM system 100 comprises a transmitter circuit 102, a receiver circuit 104 and a channel 106. The transmit circuit 102 is configured to generate a transmit signal 108 comprising data and transmit the transmit signal 108 over the channel 106. In some embodiments, the transmit signal 108 comprises an OFDM signal at radio frequency (RF). The receiver circuit 104 is configured to receive a receive signal 110 comprising a noisy version of the transmit signal 108, due to the reflections within the channel medium 106 and added white Gaussian noise (AWGN). In some embodiments, the receive signal 110 comprises an OFDM signal at radio frequency. In some embodiments, the receiver circuit 104 can be included as part of cable modems (CM). In such embodiments, the transmitter circuit 102 can be part of the headend equipment associated with cable systems. However, in other embodiments, the receiver circuit 104 and the transmitter circuit 102 cab be a part of any other OFDM communication systems.

In some embodiments, the receive signal 110 has phase noise associated therewith. In some embodiments, the phase noise in the receive signal 110 is contributed by a common phase error (CPE), which is the phase offset common to all sub-carriers. Further, in some embodiments, the phase noise in the receive signal 110 is contributed by inter-carrier-interference or ICI, which is the interference between OFDM subcarriers within each symbol OFDM symbol of an OFDM signal (e.g., the receive signal 110). In some embodiments, the transmitter circuit 102 comprises a frequency domain (FD) transmitter circuit 112 configured to map data into sub-carriers of OFDM symbols to generate a frequency domain OFDM signal 130. Some sub-carriers, defined as pilot subcarriers or pilots, are filled with known modulation. The transmitter circuit 102 further comprises an inverse fast Fourier transform (IFFT) circuit 114 configured to convert the frequency domain OFDM signal 130 into a time-domain OFDM signal 132.

In addition, the transmitter circuit 102 comprises a transmit front end circuit 116, configured to receive and process the time-domain OFDM signal 132, thereby forming the transmit signal 108. In some embodiments, the transmit front end circuit 116 can comprise a digital-to-analog converter (DAC) configured to convert the digital OFDM signal 134 into analog domain, in order to generate the transmit signal 108. In some embodiments, the transmitter circuit 102 can further comprise an add cyclic prefix (CP) circuit (not shown) configured to add a CP to the time-domain OFDM signal 132, prior to providing the time-domain OFDM signal 132 to the transmit front end circuit 116. In some embodiments, the add cyclic prefix (CP) circuit can be coupled to the IFFT circuit 114 and/or can be part of the transmit front end circuit 116. In other embodiments, the transmitter circuit 102 can comprise other components/circuits associated therewith than that is explained above.

The receiver circuit 104 comprises a receive front end circuit 118 comprising a receiver digital and analog front end configured to bring down the receive signal 110 to baseband and digitized to in-phase and quadrature components as in a zero-IF receiver or be converted to digital at intermediate frequency (IF) without bringing to baseband, thereby forming a time-domain OFDM signal 134. In some embodiments, receive front end circuit 118 associated with cable modems convert the receive signal 110 to IF. In some embodiments, for example, in cable modems, the receive front end circuit 118 use full-band capture in which the entire bandwidth up to 1.2 GHz is sampled using a very fast ADC. In some embodiments, the receive front end circuit 118 can comprise a remove CP circuit (not shown) configured to remove the CP associated with the receive signal 110, in order to generate the time-domain OFDM signal 134. Furthermore, the receiver circuit 104 comprises a fast Fourier transform (FFT) circuit 120 configured to convert the time-domain OFDM signal 134 into a frequency-domain OFDM signal 136. In addition, the receiver circuit 104 comprises a frequency domain (FD) receiver circuit 122 configured to process the frequency-domain OFDM signal 136. In other embodiments, the receiver circuit 104 can comprise other components/circuits associated therewith.

In some embodiments, the FD receiver circuit 122 can further comprise an inter-carrier interference (ICI) mitigation circuit 122a and a frequency domain (FD) processor circuit 122b. In some embodiments, the ICI mitigation circuit 122a is configured to implement an ICI mitigation algorithm, in order to mitigate ICI associated with the receive signal 110 (or the frequency-domain OFDM signal 136), in order to generate a desired OFDM signal 138, the details of which are given in an embodiment below. The FD processor circuit 122b is configured to process the desired OFDM signal 138. In some embodiments, the ICI mitigation circuit 122a and the FD processor circuit 122b can be implemented separately as shown herein. Alternately, in other embodiments, the ICI mitigation circuit 122a and the FD processor circuit 122b can be implemented as a single circuit. In some embodiments, mitigating the ICI associated with the receive signal 110 enables to reduce the phase noise in the receiver circuit 104. In some embodiments, the ICI is caused due to the interference between OFDM subcarriers with each OFDM symbol associated with the receive signal 110 (or the frequency domain OFDM signal 136 associated therewith). In this embodiment, the ICI mitigation circuit 122a is shown to be a part of the FD receiver circuit 122. However, in other embodiments, the ICI mitigation circuit 122a can be implemented differently, for example, as a separate circuit from the FD receiver circuit 122. In some embodiments, the ICI mitigation circuit 122a can be coupled to an output of the FFT circuit 120 and is configured to receive the frequency domain OFDM signal 136, in order to mitigate the ICI associated with the receive signal 110.

In order to derive the ICI mitigation algorithm, in some embodiments, a Taylor series expansion of a receive signal (e.g., the receive signal 110) in an OFDM communication system is utilized, which enables to model the phase noise (or the ICI) associated therewith. Following definitions/notations used herein, in order to model the phase noise:

OFDM discrete Fourier transform (DFT) size is N. Natural OFDM sample time T gives symbol length NT.

Set of pilot subcarriers or pilots used to estimate ICI in a given symbol $\{k_i|i=0, 2, K-1\}$ where K is the number of pilots or pilot subcarriers.

Denote number of used subcarriers in OFDM, L, where L<N. Complex data symbol carried in used subcarriers are $X_m$ for $m \in \{m_0, \ldots m_{L-1}\}$.

Per carrier modulation error ratio (MER) (i.e. can decide which carriers are good/bad), signal-to-noise ratio (SNR)m for $m \in \{m_0, \ldots, m_{L-1}\}$ Per sub-carrier channel estimates for used subcarriers, $H_m$ form $m \in \{m_0, \ldots, m_{L-1}\}$. In DOCSIS 3.1, channel per subcarrier are estimated using scattered pilots (SPs).

RF frequency fc. RF sample time $T_{RF}$ (e.g. $1/T_{RF}=3$ GHz)

Consider an inter-symbol interference (ISI) free window of OFDM symbol of length T*N, selected from removing ISI affected CP. Subcarriers are orthogonal within this ISI free signal and therefore signal is band limited. In some embodiments, a discrete frequency Fourier transform (DFFT) is utilized to represent the continuous time OFDM signal as follows:

$$x(t)=\sum_{m \in \mathcal{M}} X_m H_m e^{j2\pi mt}/NT \text{ for } 0<t<NT \quad (1)$$

In some embodiments, the signal x(t) above corresponds the receive signal 110 in FIG. 1. Signal at RF frequency, fc, represented in complex baseband form, is given by, $$x_{RF}(t)=\sum_{m \in \mathcal{M}} X_m H_m e^{j2\pi mt}/NT * e^{-j2\pi fct} \quad (2)$$

Figure 2:
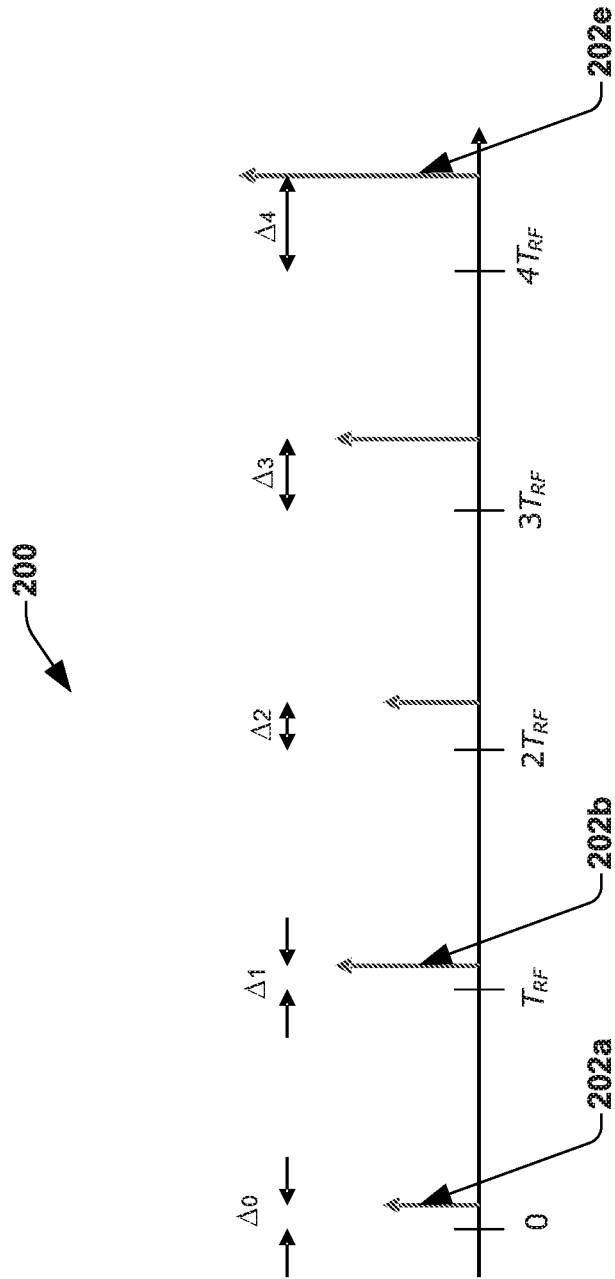
FIG. 2 depicts the normalized accumulating time jitter associated with an OFDM signal, according to one embodiment of the disclosure.

Note the actual RF signal is the real part of $x_{RF}(t)$, but the equation is kept in complex form (2) herein, for simplicity. To get baseband equivalent sampled signal, it is assumed that the ith sample has an accumulated time jitter of $\Delta_i$, with respect to ideal RF sample grid as shown in FIG. 2. Here the samples 202a, 202b . . . 202e, represent the sampled signal.

Sampled RF signal is digitally down converted to baseband, which can be represented as given below:

$$y_{bb}(n)=x_{RF}(nT_{RF}+\Delta_n)*e^{j2\pi fc nT_{RF}} \quad (3)$$

Decimate the signal in (3) by factor of R>1 to convert to natural OFDM sample rate, $T=R*T_{RF}$. Assume R to be an integer for simplicity.

$$y_{bb}(Rn)=x_{RF}(nT+\Delta_{Rn})*e^{j2\pi fc nT} \quad (4)$$

Substituting (2) in (4), we get, $$y_{bb}(Rn)=\sum_{m \in \mathcal{M}} X_m H_m e^{j2\pi m(nT+\Delta_{Rn})}/NT * e^{-j2\pi fc \Delta_{Rn}} \quad (5)$$

In some embodiments, the signal $y_{bb}(Rn)$ corresponds to the time-domain OFDM signal 134 in FIG. 1. Equation (5) can be viewed as product of two discrete time signals as given below:

$$y_{bb}(Rn) = s_1(n) \times s_2(n) \quad (6)$$

where, $s_1(n) = \sum_{m \in \mathcal{M}} X_m H_m e^{j2\pi m(nT+\Delta_{RN})}/NT$, $s_2(n) = e^{-2\pi f_c \Delta_{Rn}}$
Signal $s_2(n)$ captures the phase noise component due to time jitter. This is similar to phase noise caused by a non-ideal mixer with phase noise. Signal $s_1(n)$ is a baseband OFDM signal sampled using sample clock with jitter.

Both the phase noise component and jitter component cause ICI as can be shown below. OFDM demodulation is done with the DFT of sampled signal in (6). Taking DFT of both sides of (6), for sample set n=0, 1, . . . , N−1, we get an expression for k'th OFDM sub-carrier, $$Y(k) = S1(k) \otimes S2(k) \quad (7)$$

In some embodiments, Y(k) corresponds to a $k^{th}$ subcarrier associated with frequency domain OFDM signal 136. The product in time domain signals in (6) corresponds to convolution, $\otimes$, in frequency domain signals in (7) (cyclic convolution in this case because of discrete signals). DFT of individual time signals s1 and s2 are given by, $$S_1(k) = \frac{1}{N} \sum_{n=0}^{N-1} \sum_{m \in \mathcal{M}} X_m H_m e^{j2\pi m(nT+\Delta_{Rn})/NT} e^{-j2\pi kn/N} \quad (8A)$$

$$S_2(k) = \frac{1}{N} \sum_{n=0}^{N-1} e^{-2\pi f_c \Delta_{Rn}} e^{-j2\pi kn/N} \quad (8B)$$

Variation of accumulative jitter $\Delta_{Rn}$ over an OFDM symbol for a good enough timing source can be shown to agree with following condition, $$\frac{|\Delta_{Rn} - \overline{\Delta}|}{T} \ll 1 \quad (9A)$$

Where $\overline{\Delta}$ is the mean jitter for the OFDM symbol.
For usable RF center frequencies (e.g. $f_c$<1.2 GHz for DOCSIS3.1), the following condition is also applicable:

$$|\Delta_{Rn} - \overline{\Delta}| f_c \ll 1 \quad (9B)$$

Variation of jitter around mean is defined as $\delta_n = \Delta_{Rn} - \overline{\Delta}$ and this definition is utilized in (8A) to simplify equation as below:

$$S_1(k) = \frac{1}{N} \sum_{n=0}^{N-1} \sum_{m \in \mathcal{M}} X_m H_m e^{j2\pi m(nT+\delta_n+\overline{\Delta})/NT} e^{-j2\pi kn/N}$$

$$S_1(k) = \frac{1}{N} \sum_{m \in \mathcal{M}} X_m H_m e^{j2\pi m \overline{\Delta}/NT} \sum_{n=0}^{N-1} e^{j2\pi m(nT+\delta_n)/NT} e^{-j2\pi kn/N}$$

Further, applying (9A) above and using the approximation $e^{j\theta} \cong 1 + j\theta$ for $\theta \ll 2\pi$, we get $$S_1(k) = \frac{1}{N} \sum_{m \in \mathcal{M}} X_m H_m e^{j2\pi m \overline{\Delta}/NT} \sum_{n=0}^{N-1} \left(1 + j\frac{2\pi m \delta_n}{NT}\right) e^{-j2\pi(k-m)/N} \quad (10)$$

$$S_1(k) = X_k H_k e^{j2\pi k \overline{\Delta}/NT} + \sum_{m \in \{\mathcal{M}/k\}} X_m H_m e^{j2\pi m \overline{\Delta}/NT} \frac{j2\pi m}{N^2}$$

Time jitter process is a slowly varying process within an OFDM symbol. Hence the DFT given by $$D(l) = \frac{1}{N} \sum_{n=0}^{N-1} \frac{\delta_n}{T} e^{-j2\pi nl/N}$$

can be expected to have only few significant low frequency terms. Assuming D(l) coefficients beyond l=L is negligible, $l \in \mathcal{L} = \{-L, \ldots, -1, 1, \ldots, L\}$ then equation (10) can be approximated as, $$S_1(k) = X_k H_k e^{j2\pi k \overline{\Delta}/NT} + \sum_{l \in \mathcal{L}} X_{k+l} H_{k+l} e^{j2\pi(k+l)\overline{\Delta}/NT} \frac{j2\pi(k+l)}{N} D(-l) \quad (11)$$

Similarly, substituting $\delta_n$ in (8B) and using the approximation $e^{-2\pi f_c \delta_n} \cong 1 - 2\pi f_c \delta_n$ for $f_c \delta_n \ll 1$ we get, $$S_2(k) = \begin{cases} e^{-2\pi f_c \overline{\Delta}} & \text{for } k = 0 \\ e^{-2\pi f_c \overline{\Delta}} \frac{-j2\pi f_c T}{N} \sum_{n=0}^{N-1} \frac{\delta_n}{T} e^{-j2\pi kn/N} & \text{for } k \neq 0 \end{cases} \quad (12)$$

Substituting for D(l) in (12), we get, $$S_2(k) = \begin{cases} e^{-2\pi f_c \overline{\Delta}} & \text{for } k = 0 \\ -e^{-2\pi f_c \overline{\Delta}} * j2\pi f_c T * D(k) & \text{for } k = \pm 1, \ldots, \pm L \\ 0 & \text{for } |k| > L \end{cases} \quad (13)$$

Equation (11) shows the ICI component due to equivalent baseband jitter is independent of the carrier frequency, which is referred to herein as fitter ICI. For practical time jitter profiles, the jitter ICI component does not cause noticeable performance loss. Equation (13) shows ICI component due to phase noise of jitter is a function of carrier frequency referred to herein as phase noise ICI. The above insight gives the framework for the proposed ICI mitigation algorithm. Firstly, it can be shown that jitter ICI component is negligible compared to phase noise ICI component: From (11), amplitude factor for jitter ICI is $$\frac{2\pi m}{N}$$

and from (13), amplitude factor for phase noise ICI is $2\pi f_c T$. Worst jitter ICI level occurs for sub-carriers with largest m, m=N/2 (usually largest m is slightly less than N/2). This ICI level is equivalent to phase noise ICI level for carrier frequency of 1/(2T). For DOCSIS 3.1, this carrier frequency corresponds to 102.4 MHz. Hence for large $f_c$, where the ICI due to time jitter becomes more of a problem, fitter ICI is small compared to phase noise ICI. For example, for $f_c$=500 MHz, maximum jitter ICI is 20 log 10(500/102.4)=13.7 dB below phase noise ICI.

Therefore, based on the above analysis, the jitter ICI contribution can be ignored and significant gain can still be achieved by cancelling the phase noise ICI. Furthermore, the same methods can be used to do phase noise ICI cancellation for full bandwidth capture and direct conversion receivers. Ignoring jitter ICI, equation (11) can be simplified to the following:

$$S_1(k) = X_k H_k e^{j2\pi k \overline{\Delta}/NT} \quad (14)$$

Substituting (13) and (14) in (7), we get OFDM subcarrier k, $$Y(k) \cong e^{-2\pi f_c \overline{\Delta}}[X_k H_k e^{j2\pi k \overline{\Delta}}/NT - j2\pi f_c T \sum_{l \in \mathcal{L}} D(-l) X_{k+l} H_{k+l} e^{j2\pi(k+l)\overline{\Delta}}/NT] \quad (15)$$

Equation (15) gives the common phase error (CPE) and phase error gradient (PEG) due to phase noise in OFDM symbol.

$$\text{CPE} = -2\pi f_c \overline{\Delta}, \text{ and PEG} = 2\pi \overline{\Delta}/NT \quad (15a)$$

In some embodiments, the CPE and the PEG are estimated as part of receiver phase correction algorithms, using the pilot sub-carriers.
Substituting $Y_1(k) = e^{-2\pi f_c \overline{\Delta}} X_k H_k e^{j2\pi k \overline{\Delta}}/NT$ in (15), we get $$Y(k) \cong Y_1(k) - j2\pi f_c T \sum_{l \in \mathcal{L}} D(-l) Y_1(k+l) \quad (16)$$

Where subcarrier without ICI is $Y_1(k)$, and ICI term is $j2\pi f_c T \sum_{l \in \mathcal{L}} D(-l) Y_1(k+l)$. In some embodiments, $Y_1(k)$ comprises an OFDM subcarrier associated with a desired OFDM signal (e.g., the desired OFDM signal 138 in FIG. 1), free of ICI.
In order to estimate the ICI term, however, 2L coefficients, $-j2\pi f_c TD(-l)$ for $l \in \mathcal{L}$ have to be estimated. With limited pilots in DOCSIS 3.1 we cannot get a good estimate.

In some embodiments, the number of parameters that needs to be estimated can be reduced by assuming jitter variation within OFDM symbol to be second order (quadratic), $\delta_n \alpha + bn + cn^2$. With this assumption, D(l) in closed form can be calculated as, $$D(l) = \quad (17)$$

$$\frac{1}{NT}\left(-\frac{bN}{1-e^{-j2\pi l/N}} - cN\left(\frac{N\left(1-e^{-j2\pi l/N}\right) + 2e^{-j2\pi l/N}}{\left(q - e^{-j2\pi l/N}\right)^2}\right)\right) \text{ for } l \neq 0$$

ICI contribution is significant for only few adjacent carriers. i.e. $1 \leq L \ll N$. Hence substituting $$e^{-j2\pi l/N} \cong 1 - \frac{j2\pi l}{N}$$

in (17), we get $$D(l) = \frac{N}{T(2\pi)^2}\left(\frac{2j\pi(b + (N-2)c)}{l} + \frac{2cN}{l^2}\right) \text{ for } l \neq 0 \quad (18)$$

Finally, substituting (18) in (16), the final form of the equation that enables to derive the proposed ICI estimation and cancellation algorithms is as given below:

$$Y(k) \cong Y_1(k) + \alpha J_1(k) + \beta J_2(k) \quad (19)$$

where $\alpha = -f_c N(b+(N-2)c)/l$, and $\beta = -jf_c N^2 c/(\pi l^2)$ are the ICI coefficients.
and ICI kernels $J_1$ and $J_2$ are defined as $$J_1(k) = \sum_{l \in \mathcal{L}} \frac{Y_1(k+l)}{l} \text{ and } J_2(k) = \sum_{l \in \mathcal{L}} \frac{Y_1(k+l)}{l^2}$$

From equation (19), it can be seen that the number of coefficients to be estimated is reduced to only 2 here. If first order (linear) variation for jitter is assumed, then c=0 leads to $\beta$=0 and hence only $\alpha$ needs to be estimated.

In order to estimate the ICI coefficients $\alpha$ and $\beta$, ICI for pilot location k is calculated using the known pilot modulation, $X_k$, and the channel estimation, $H_k$. Further, the CPE, and PEG estimates are estimated using equation (15a), or assumed to be available, $$I(k) \cong Y(k) - e^{jCPE} X_k H_k e^{jkPEG} \quad (20)$$

In some embodiments, the term I(k) is referred to as pilot ICI and equation (20) comprises a predetermined pilot ICI relation. Further, ICI kernels for pilot location k are estimated. ICI kernels $J_1$ and $J_2$ are functions of clean sub-carriers, without the ICI.
Assuming ICI is small compared to sub-carriers (generally at least 40 dB below signal power), the sub-carrier with ICI, Y(k), is used to closely approximate ICI kernels:

$$J_1(k_i) \cong \sum_{l \in \mathcal{L}} \frac{Y(k_i+l)}{l} \quad J_2(k_i) \cong \sum_{l \in \mathcal{L}} \frac{Y(k_i+l)}{l^2} \quad (21)$$

In some embodiments, the equation (21) comprises a predetermined pilot ICI kernel relation. Now, define the set of pilot locations, $K=\{k_i | i=0, 2, K-1\}$,
Using matrix form, for second order variation of time jitter, ICI for K pilot locations can be written as, $$I = J\begin{bmatrix}\alpha \\ \beta\end{bmatrix}, \quad (22)$$

where $I = [I(k_0) \ldots I(k_{K-1})]^T$, $$J = \begin{bmatrix} J_1(k_0) & J_2(k_0) \\ \vdots & \vdots \\ J_1(k_{K-1}) & J_2(k_{K-1}) \end{bmatrix},$$

and T is matrix transpose.
On solving equation (22), the ICI parameters (assuming at least 2 pilots) can be estimated as, $$\begin{bmatrix}\alpha \\ \beta\end{bmatrix} = [J^H J]^{-1} J^H I \quad (23)$$

Where $[\ ]^H$ denotes Hermitian transpose and $[\ ]^{-1}$ denotes matrix inverse.
For first order variation of time jitter, $$I = J_1 \alpha \quad (24)$$

ICI parameter a can be estimated by simple correlation as follows, $$\alpha = \frac{J_1^H I}{J_1^H J_1} \quad (25)$$

In some embodiments, equations (23) and (25) comprises predetermined ICI coefficient relations. We can further noise filter ICI coefficients forcing $\alpha$ to be real and $\beta$ to be imaginary (this is clear from equation (19) above). Once ICI coefficients are estimated, ICI cancellation can be done in two steps. First, ICI kernels for sub-carrier k are estimated using equation (21). Then, based on equation (19), ICI cancellation can be done as follows:

$$Y_1(k) \approx Z(k) = Y(k) - \alpha J_1(k) - \beta J_2(k) \quad (26)$$

Where $Y_1(k)$ is a desired OFDM subcarrier without ICI (associated with the desired OFDM signal 138), Y(k) is the OFDM subcarrier with ICI (associated with the frequency-domain OFDM signal 136), $\alpha J_1(k)+\beta J_2(k)$ is the ICI associated with the OFDM subcarrier Y(k). In some embodiments, the equation (26) comprises a predetermined ICI cancellation relation.

Figure 3:
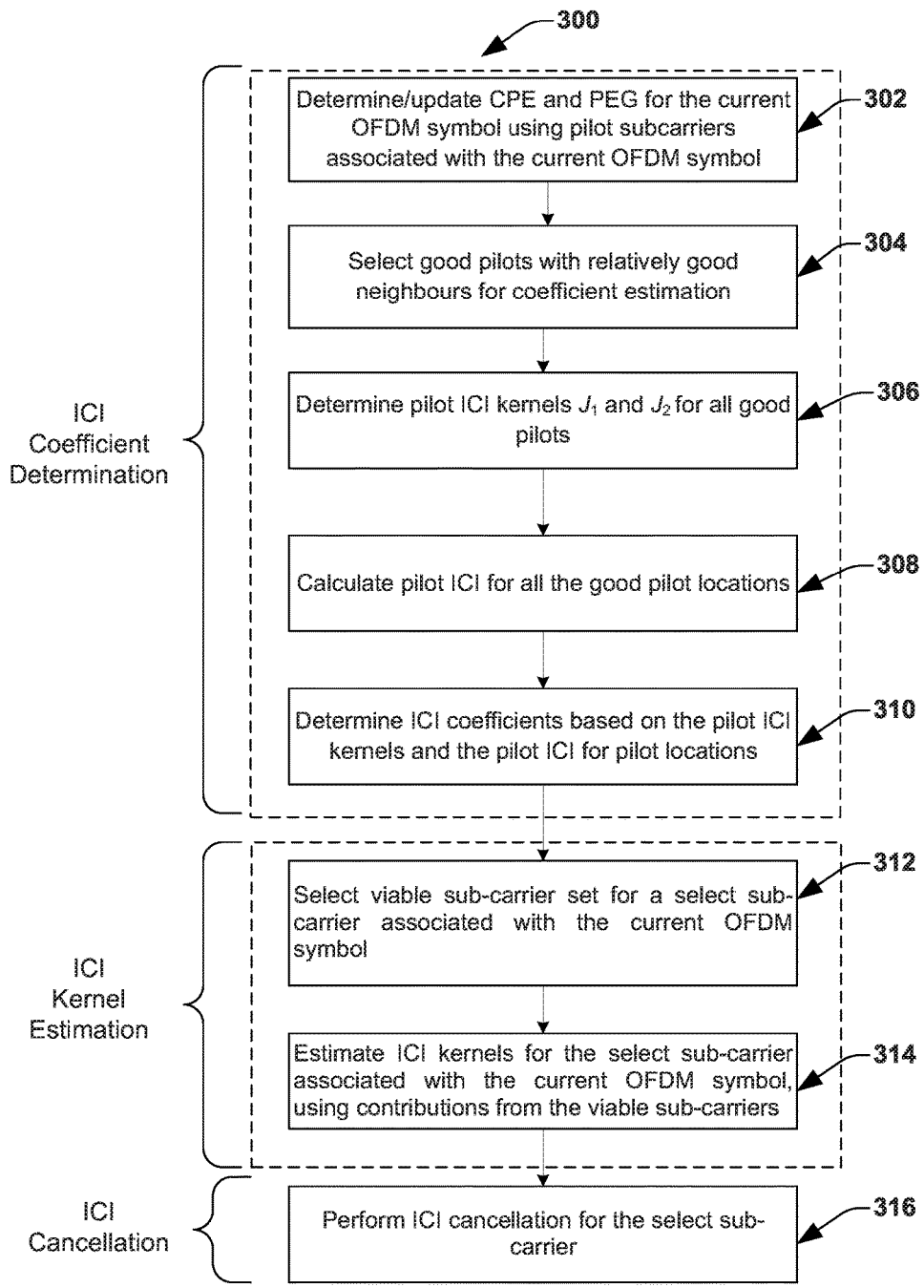
FIG. 3 illustrates a flow diagram of an ICI mitigation algorithm, according to one embodiment of the disclosure.

FIG. 3 illustrates a flow diagram of an ICI mitigation algorithm 300, according to one embodiment of the disclosure. In some embodiments, the ICI mitigation algorithm 300 is explained herein with reference to the OFDM system 100 in FIG. 1 and the equations described above with respect to FIG. 1. In some embodiments, the ICI mitigation algorithm 300 can be implemented within the ICI mitigation circuit (e.g., the ICI mitigation circuit 122a), as explained above with respect to FIG. 1. However, in other embodiments, the ICI mitigation algorithm 300 can be implemented differently. In some embodiments, ICI mitigation circuit uses data in FFT output buffer (e.g. the FFT circuit 120), in a receiver circuit (e.g., the receiver circuit 104 in FIG. 1) of an OFDM system (e.g., the OFDM system 100 in FIG. 1) as its input. The ICI mitigation algorithm 300 is implemented on a sub-carrier basis, for various OFDM symbols associated with an OFDM signal. For ease of explanation, the ICI mitigation algorithm 300 is explained herein, with reference to a select sub-carrier k associated with an OFDM symbol. However, in other embodiments, the ICI mitigation algorithm 300 can be utilized to cancel ICI associated with one or more sub-carriers associated with various OFDM symbols in an OFDM signal, in order to generate a desired OFDM signal (e.g., the desired OFDM signal 138 in FIG. 1).

At 302, the common phase error (CPE) and phase error gradient (PEG) due to phase noise in an OFDM symbol (e.g., associated with the frequency-domain OFDM signal 136 in FIG. 1) is determined or updated to reflect a current symbol data in FFT buffer (e.g., the FFT circuit 120 in FIG. 1). In some embodiments, the CPE and the PEG are determined based on implementing equation (15a) above. At 304, good pilots (or pilot sub-carriers) with relatively good neighbors associated with the current OFDM signal (e.g., associated with the frequency-domain OFDM signal 136 in FIG. 1) are determined for coefficient estimation. In some embodiments, the good pilots are determined based on signal-to-noise ratio (SNR), for example, high pilot SNR (e.g. $SNR_i$>30 dB) and also relatively high SNR for the neighboring 2L carriers (e.g. $SNR_i$>25 dB). In some embodiments, the good pilot set can be denoted as, K={$k_i$|=0, 2, K-1}. However, in other embodiments, the good pilot set can be determined differently (may or may not be based on the SNR values) and can comprise all the pilots associated with the OFDM symbol. At 306, pilot ICI kernels $J_1$ and $J_2$ are determined for all good pilots in the good pilot set determined above at 304. In some embodiments, the pilot ICI kernels are determined using the equation (21) above. At 308, pilot ICI for pilot location $k_i$ is determined. In some embodiments, the pilot ICI for pilot location $k_i$ is determined using equation (20) above. In some embodiments, common phase error (CPE) and phase error gradient (PEG) from the current OFDM symbol (determined at 302 above), and a channel estimate from the current or previous OFDM symbol is utilized, in order to determine the pilot ICI using equation (20). At 310, the ICI coefficients $\alpha$ and $\beta$ are determined, based on the ICI kernels and the pilot ICI determined at 306 and 308, respectively, based on solving the equation (22) above. In some embodiments, for example, for second order variation of time jitter, the ICI coefficients are determined using equation (23) above. Alternately, in other embodiments, for example, for first order variation of time jitter, the ICI coefficients are determined using equation (25) above. In some embodiments, $\alpha$ is forced to be real and $\beta$ is forced to be imaginary.

At 312, a viable sub-carrier set which passes a predetermined threshold is determined from neighboring sub carriers, {k+l|l∈$\mathcal{L}$}, for a select sub-carrier k of the current OFDM symbol. In some embodiments, the viable sub-carrier set is determined using the following threshold:

$$l_k \in \{l \in \mathcal{L} \mid (SNR(k+l) > SNR\_ICI\_CANC\_TH) \text{ and } (|Y(k+l)| > AMP\_ICI_{13} CANC\_TH)\}$$

Where $l_k$ comprises all the sub-carriers within the current OFDM symbol that satisfies the threshold. In some embodiments, determining the viable sub-carrier set enables to improve the robustness of ICI cancellation by ignoring the ICI contribution from bad sub-carriers (e.g. SNR<15 dB) and sub-carriers with small amplitudes (because they carry small amplitude constellation points). However, in other embodiments, the viable sub-carrier set $l_k$ can be determined differently using a different threshold. Further, in some embodiments, the viable subcarrier set $l_k$ can comprise one or more of the neighboring subcarriers of the select subcarrier k, and the viable subcarrier set $l_k$ may or may not be determined based on a predefined threshold. At 314, ICI kernels for the select subcarrier k can be estimated using contributions from viable sub-carriers $l_k$, based on the following equations:

$$J_1(k) \cong \sum_{l=l_k} \frac{Y(k+l)}{l} \text{ and } J_2(k) \cong \sum_{l=l_k} \frac{Y(k+l)}{l^2} \quad (27)$$

In some embodiments, if the first order variation of time jitter is considered, only the ICI kernel $J_1(k)$ is estimated. However, in other embodiments, if the second order variation of time jitter is considered, both the ICI kernels $J_1(k)$ and $J_2(k)$ are estimated. In some embodiments, the equation (27) comprises a predetermined ICI kernel relation. At 316, the ICI cancellation for the select sub-carrier k is performed using equation (26) above, in order to generate a desired OFDM subcarrier (associated with the desired OFDM signal 138 in FIG. 1), from the select sub-carrier k, based on the ICI kernels determined at 314 and the ICI coefficients determined at 310 above. In some embodiments, determining the viable subcarrier set for the select subcarrier at 312, estimating the ICI kernels for the select subcarrier at 314 and cancelling the ICI for the select subcarrier at 316 are repeated for one or more subcarriers (or all subcarriers, in some embodiments) associated with the OFDM symbol. In some embodiments, the one or more subcarriers to be utilized for cancelling the ICI is predetermined.

Figure 4:
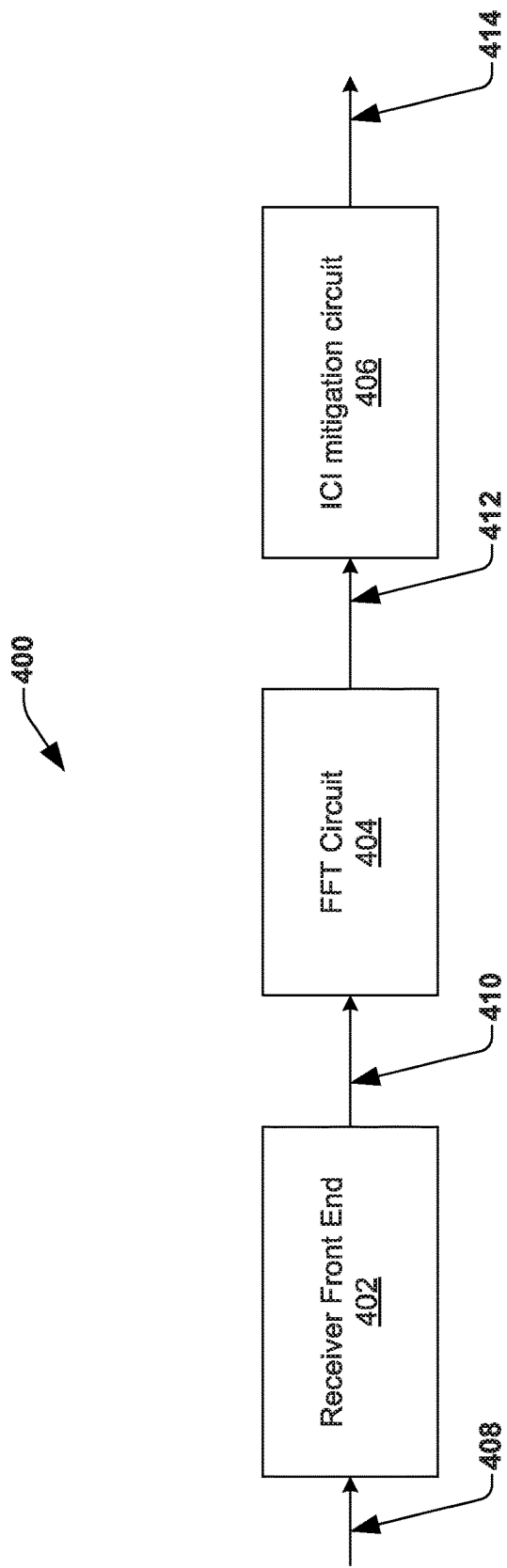
FIG. 4 illustrates a simplified block diagram of an exemplary orthogonal frequency division multiplexing (OFDM) receiver associated with an OFDM system, according to one embodiment of the disclosure.

FIG. 4 illustrates a simplified block diagram of an exemplary orthogonal frequency division multiplexing (OFDM) receiver 400 associated with an OFDM system, according to one embodiment of the disclosure. In some embodiments, the OFDM receiver 400 can be included with a cable modem (CM) implemented according to data over cable service interface specification (DOCSIS) standard. In other embodiments, the OFDM receiver can be included as part of any other OFDM communication systems. In some embodiments, the OFDM receiver 400 can comprise more or less components than that is illustrated in FIG. 4. In some embodiments, the OFDM receiver 400 can be included within or is equivalent to the receiver circuit 104 in FIG. 1. The OFDM receiver 400 comprises an analog and digital front end 402 configured to receive a receive signal 408 and generate a digital-domain OFDM signal 410. In some embodiments, the receive signal 408 comprises an OFDM signal at radio frequency and the digital-domain OFDM signal 410 is a digital version of the receive signal 408. In some embodiments, the digital-domain OFDM signal 410 comprises a time-domain signal. In some embodiments, the receive signal 408 comprises phase noise associated with it. The OFDM receiver 400 further comprises an FFT circuit 404 configured to generate a frequency-domain OFDM signal 412, from the digital-domain OFDM signal 410.

In some embodiments, the frequency-domain OFDM signal 412 comprises a plurality of OFDM symbols, each OFDM symbol comprising a plurality of OFDM subcarriers. In some embodiments, phase variation within OFDM symbol contribute to interference between the OFDM subcarriers with each OFDM symbol, referred to as inter carrier interference or ICI, thereby contributing to phase noise. In some embodiments, the OFDM receiver 400 further comprises an ICI mitigation circuit 406 configured to receive the frequency-domain OFDM signal 412 and generate a cancellation of the ICI associated with the frequency-domain OFDM signal 412. In particular, the ICI mitigation circuit 406 can configured to cancel the ICI between OFDM subcarriers associated with one or more OFDM symbols of the plurality of OFDM symbols associated with the frequency-domain OFDM signal 412. In some embodiments, the ICI between OFDM subcarriers within the OFDM symbols associated with the frequency-domain OFDM signal 412 is cancelled within the ICI mitigation circuit 406, based on implementing the ICI mitigation algorithm 300 above. In some embodiments, the ICI cancellation is done on an OFDM subcarrier basis. In some embodiments, the ICI mitigation circuit 406 can be included within or is equivalent to the ICI mitigation circuit 122a in FIG. 1 above.

In some embodiments, the ICI mitigation circuit 406 can comprise one or more components, in order to implement the ICI mitigation algorithm 300 above. For example, in some embodiments, the ICI mitigation circuit 406 can comprise an ICI cancellation circuit (not shown) configured to receive the frequency-domain OFDM signal 412 and determine the ICI associated with the OFDM symbols of the frequency-domain OFDM signal 412, in order to cancel the ICI associated with the frequency-domain OFDM signal 412, based on the ICI mitigation algorithm 300. In some embodiments, in order to determine the ICI within an OFDM symbol associated with the frequency-domain OFDM signal 412, the ICI cancellation circuit can be configured to determine good pilots or good pilot subcarriers with good neighbors associated with the OFDM symbol (e.g., as given in 304 of the ICI mitigation algorithm in FIG. 3 above). In some embodiments, the good pilots are determined based on SNR per subcarrier values of the plurality of pilot subcarriers associated with the OFDM symbol. However, in other embodiments, the good pilots can be determined differently than above. In some embodiments, the ICI mitigation circuit 406 can further comprise a signal-to-noise ratio (SNR) estimation circuit (not shown) coupled to the ICI cancellation circuit and configured to determine the SNR associated with each of the plurality of pilot subcarriers and provide the determined SNR to the ICI cancellation circuit, in order to determine the set of good pilot subcarriers.

Further, in some embodiments, the ICI cancellation circuit can be configured to determine pilot ICI kernels for the set of good pilot subcarriers (e.g., as given in 306 of the ICI mitigation algorithm in FIG. 3 above). In some embodiments, the ICI cancellation circuit can be further configured to calculate ICI for pilot locations, for example, a pilot ICI, in combination with the pilot modulation, channel estimate, CPE, and PEG (e.g., as given in 308 of the ICI mitigation algorithm in FIG. 3 above). In some embodiments, the ICI mitigation circuit 406 can further comprise a channel estimation circuit coupled to the ICI cancellation circuit and configured to determine the channel estimate associated with the previous OFDM symbol and provide the channel estimate to the ICI cancellation circuit, in order to determine the pilot ICI value at the ICI cancellation circuit. In some embodiments, the ICI mitigation circuit 406 can further comprise a phase analysis circuit coupled to the ICI cancellation circuit and configured to determine the CPE and the PEG associated with the OFDM symbol, and provide the CPE and the PEG to the ICI cancellation circuit for determining the pilot ICI value.

In some embodiments, the channel estimation circuit, the SNR estimation circuit and the phase analysis circuit can be implemented as part of the ICI mitigation circuit 406, as explained above. However, in other embodiments, the channel estimation circuit, the SNR estimation circuit and the phase analysis circuit can be implemented outside of the ICI mitigation circuit 406, for example, as part of a baseband processor associated with the receiver circuit. In such embodiments, the ICI mitigation circuit 406 can be equivalent to the ICI cancellation circuit. Further, in other embodiments, the channel estimation circuit, the SNR estimation circuit and the phase analysis circuit can be implemented differently, and the ICI mitigation circuit 406 can comprise more or less than the components illustrated with respect to FIG. 5. Upon determining the pilot ICI, the ICI cancellation circuit can be configured to determined ICI coefficients, $\alpha$ and $\beta$ (e.g., as given in 310 of the ICI mitigation algorithm 300 in FIG. 3 above).

Furthermore, in some embodiments, the ICI cancellation circuit can be configured to select viable subcarrier set that satisfies predetermined thresholds for a select subcarrier k and estimate ICI kernels for the select subcarrier k, using contributions from the viable sub-carriers (e.g., as given in 312 and 314 of the ICI mitigation algorithm in FIG. 3 above, respectively). Upon determining the ICI kernels for the select subcarrier k, the ICI cancellation circuit can be further configured to perform ICI cancellation for the select subcarrier k (e.g., as given in 314 of the ICI mitigation algorithm in FIG. 3 above), in order to generate a desired OFDM subcarrier. In some embodiments, the ICI cancellation circuit can be further configured to perform ICI cancellation for a plurality of OFDM subcarriers associated with the one or more OFDM symbols associated with the frequency-domain OFDM signal 412, in order to generate a desired OFDM signal 414.

Figure 5:
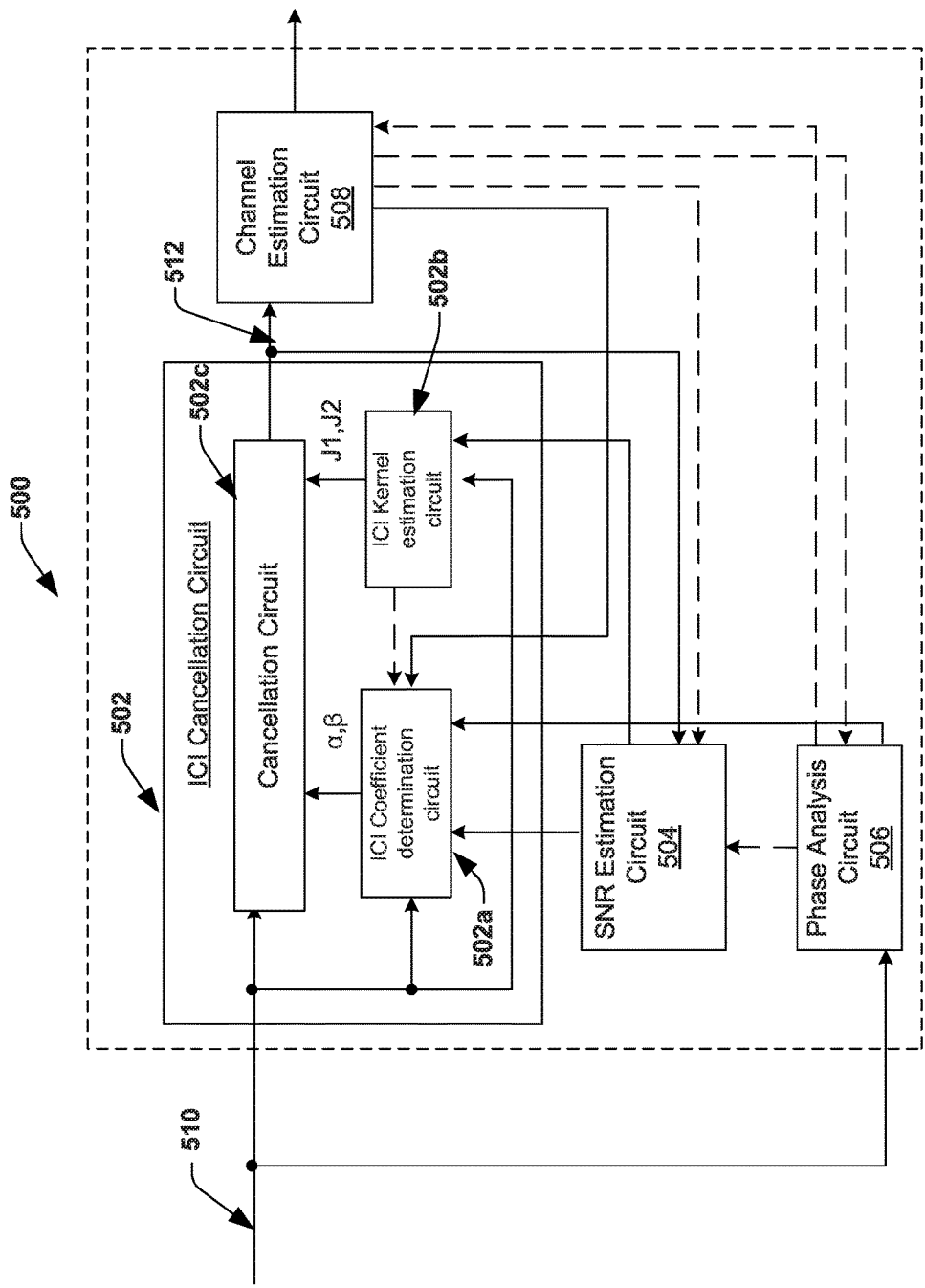
FIG. 5 illustrates an example implementation of an exemplary ICI mitigation circuit, according to one embodiment of the disclosure.

FIG. 5 illustrates an example implementation of an exemplary ICI mitigation circuit 500, according to one embodiment of the disclosure. In some embodiments, the ICI mitigation circuit 500 depicts one possible way of implementation of the ICI mitigation circuit 406 in FIG. 4 or the ICI mitigation circuit 122*a* in FIG. 1. The ICI mitigation circuit 500 is explained herein with reference to the ICI mitigation algorithm 300 in FIG. 3 above. The ICI mitigation circuit 500 comprises an ICI cancellation circuit 502 configured to receive a frequency domain orthogonal frequency domain multiplexing (OFDM) signal 510 comprising a plurality of OFDM symbols associated therewith. In some embodiments, the frequency domain OFDM signal 510 is similar to the frequency domain OFDM signal 136 in FIG. 1 or the frequency domain OFDM signal 412 in FIG. 4. The ICI cancellation circuit 502 is further configured to determine an inter carrier interference (ICI) associated with frequency domain OFDM signal 510 and cancel the determined ICI from the frequency domain OFDM signal 510, in order to generate a desired OFDM signal 512. In particular, the ICI cancellation circuit 502 is configured to determine ICI associated with one or more OFDM subcarriers associated with the plurality of OFDM symbols within the frequency domain OFDM signal 510, and cancel the ICI from the respective OFDM subcarriers, in order to generate the desired OFDM signal 512. For the ease of explanation, in this embodiment, the ICI cancellation circuit 502 is shown to cancel ICI associated with one or more OFDM subcarriers of a single OFDM symbol associated with the frequency domain OFDM signal 510. However, in other embodiments, the ICI cancellation circuit 502 can be configured to cancel the ICI associated with one or more OFDM subcarriers of one or more OFDM symbols associated with the frequency domain OFDM signal 510.

In some embodiments, in order to generate the desired OFDM signal 512, the ICI cancellation circuit 502 is configured to implement an ICI mitigation algorithm (e.g., the ICI mitigation algorithm 300 in FIG. 3 above). In some embodiments, the ICI mitigation circuit 500 further comprises a signal-to-noise ratio (SNR) estimation circuit 504 configured to determine SNR values associated with the OFDM subcarriers associated with the frequency domain OFDM signal 510 or the desired OFDM signal 512, a phase analysis circuit 506 configured to estimate a common phase error (CPE) and a phase error gradient (PEG) associated with the frequency domain OFDM signal 510 and a channel estimation circuit 508 configured to determine a channel estimate associated with the frequency domain OFDM signal 510 or the desired OFDM signal 512. However, in other embodiments, the SNR estimation circuit 504, the phase analysis circuit 506 and the channel estimation circuit 508 may not be a part of the ICI mitigation circuit 500. In such embodiments, the ICI mitigation circuit 500 is equivalent to the ICI cancellation circuit 502. In some embodiments, the SNR estimation circuit 504, the phase analysis circuit 506 and the channel estimation circuit 508 facilitates to implement the ICI mitigation algorithm within the ICI cancellation circuit 502.

In some embodiments, the ICI cancellation circuit 502 further comprises an ICI coefficient determination circuit 502*a*, an ICI kernel estimation circuit 502*b* and a cancelation circuit 502*c*. In some embodiments, the ICI coefficient determination circuit 502*a* is configured to receive an OFDM symbol associated with the frequency domain OFDM signal 510 and determine ICI coefficients $\alpha$ and $\beta$ associated with the OFDM symbol, in order to determine the ICI associated with one or more OFDM subcarriers within the OFDM symbol. In some embodiments, the ICI coefficients $\alpha$ and $\beta$ are determined within the ICI coefficient determination circuit 502*a*, based on implementing the predetermined ICI coefficient relation in equation (23) or equation (25) above (e.g., as given in 310 of the ICI mitigation algorithm 300 in FIG. 3 above). For example, for first order variation of time jitter, the ICI coefficients are determined within the ICI coefficient determination circuit 502*a*, based on implementing the predetermined ICI coefficient relation in equation (25) and for second order variation of time jitter, the ICI coefficients are determined within the ICI coefficient determination circuit 502*a*, based on implementing the predetermined ICI coefficient relation in equation (23).

In order to implement the predetermined ICI coefficient relation, in some embodiments, the ICI coefficient determination circuit 502*a* is further configured to determine good pilots or good pilot sub-carriers with good neighbors associated with the OFDM symbol (e.g., as given in 304 of the ICI mitigation algorithm 300 in FIG. 3 above). Further, the ICI coefficient determination circuit 502*a* is configured to determine pilot ICI kernels for the set of good pilot subcarriers (e.g., as given in 306 of the ICI mitigation algorithm 300 in FIG. 3 above). In addition, the ICI coefficient determination circuit 502*a* is configured to determine ICI for pilot locations, for example, a pilot ICI, in combination with information on pilot modulation, channel estimate, CPE, and PEG associated with the frequency domain OFDM signal 510 (e.g., as given in 308 of the ICI mitigation algorithm 300 in FIG. 3 above). In some embodiments, the ICI coefficient determination circuit 502*a* is further configured to receive information on the channel estimate associated with a current OFDM symbol or a previous OFDM symbol of the frequency domain OFDM signal 510 from the channel estimation circuit 508, in order to determine the pilot ICI. Further, the ICI coefficient determination circuit 502*a* is configured to receive information on the CPE and the PEG associated with the current OFDM symbol from the phase analysis circuit 506, in order to determine the pilot ICI. Further, information on the pilot modulation is assumed to be known to the ICI coefficient determination circuit 502*a*, in order to determine the pilot ICI. Upon determining the pilot ICI kernels and the pilot ICI for the OFDM symbol, the ICI coefficient determination circuit 502*a* implements the predetermined ICI coefficient relation and determines the ICI coefficients $\alpha$ and $\beta$. In some embodiments, the ICI coefficient determination circuit 502*a* is further configured to provide the determined ICI coefficients $\alpha$ and $\beta$ to the cancellation circuit 502*c*.

The ICI kernel estimation circuit 502*b* is configured to receive the OFDM symbol associated with the frequency domain OFDM signal 510 and determine ICI kernels $J_1(k)$ and $J_2(k)$ associated with one or more OFDM subcarriers k within the OFDM symbol, in order to determine the ICI associated with the one or more OFDM subcarriers within the OFDM symbol. In some embodiments, k indicates the one or more OFDM subcarriers associated with the OFDM symbol. In some embodiments, the ICI kernels $J_1(k)$ and $J_2(k)$ are determined within the ICI kernel estimation circuit 502*b*, based on implementing the predetermined ICI kernel relation in equation (27) above (e.g., as given in 314 of the ICI mitigation algorithm 300 in FIG. 3 above). In some embodiments, prior to implementing the predetermined ICI kernel relation, the ICI kernel estimation circuit 502*b* is configured to select or determine a viable subcarrier set from neighboring subcarriers for each OFDM subcarrier k, in order to estimate the ICI kernels $J_1(k)$ and $J_2(k)$ for each of the one or more OFDM subcarriers k, using contributions from the viable sub-carriers of the respective OFDM subcarriers (e.g., as given in 312 of the ICI mitigation algorithm 300 in FIG. 3 above). Upon determining the ICI kernels $J_1(k)$ and $J_2(k)$ for a select OFDM subcarrier k of the one or more OFDM subcarriers, the ICI kernel estimation circuit 502b is further configured to provide the determined ICI kernels $J_1(k)$ and $J_2(k)$ to the cancellation circuit 502c.

The cancellation circuit 502c is coupled to the ICI coefficient determination circuit 502a and the ICI kernel estimation circuit 502b, and is configured to receive the ICI coefficients α and β, and the ICI kernels $J_1(k)$ and $J_2(k)$ from the ICI coefficient determination circuit 502a and the ICI kernel estimation circuit 502b, respectively. Further, the cancellation circuit 502c is configured to receive the frequency domain OFDM signal 510. Upon receiving the ICI coefficients α and β, and the ICI kernels $J_1(k)$ and $J_2(k)$, the cancellation circuit 502c is configured to estimate the ICI associated with the select subcarrier k and cancel the ICI from the select subcarrier k, based on implementing equation (26) above (e.g., as given in 314 of the ICI mitigation algorithm in FIG. 3 above), in order to generate a desired OFDM subcarrier. In some embodiments, the cancellation circuit 502c can be further configured to perform ICI cancellation for the one or more OFDM subcarriers associated with the plurality of OFDM symbols associated with the frequency-domain OFDM signal 510, in order to generate the desired OFDM signal 512. Additional arrows in FIG. 5 illustrates the various inputs that may be received or provided from/to the various blocks to perform various functions associated therewith, however, are not explained in further detail as that is beyond the scope of this disclosure.

Figure 6:
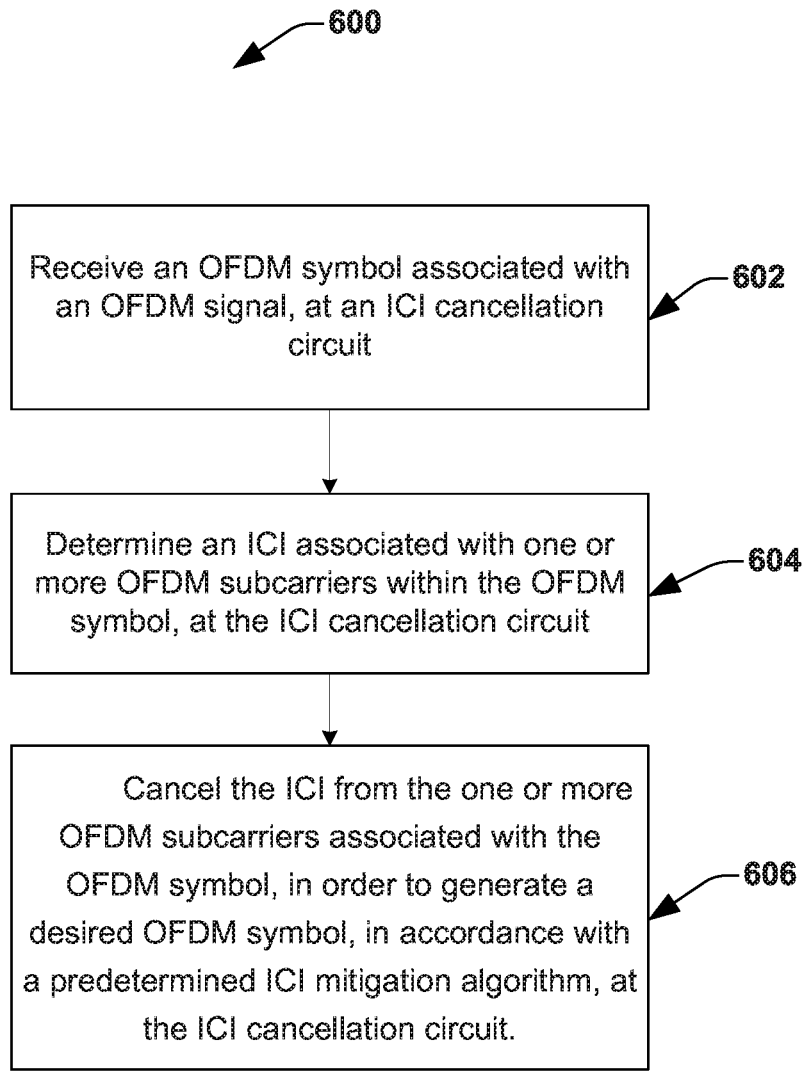
FIG. 6 illustrates a flowchart of a method for cancelling inter carrier interference (ICI) associated with an orthogonal frequency division multiplexing (OFDM) receiver, according to one embodiment of the disclosure.

FIG. 6 illustrates a flowchart of a method 600 for cancelling inter carrier interference (ICI) associated with an orthogonal frequency division multiplexing (OFDM) receiver, according to one embodiment of the disclosure. In some embodiments, the method 600 is implemented within an ICI cancellation circuit associated with the OFDM receiver. In some embodiments, the ICI cancellation circuit can be included within an ICI mitigation circuit associated with the OFDM receiver. The method 600 is described herein with reference to the ICI cancellation circuit 502 within ICI mitigation circuit 500 in FIG. 5 and further in reference to the ICI mitigation algorithm 300 in FIG. 3. However, in other embodiments, the method 600 can be applied to any OFDM receivers. At 602, an OFDM symbol associated with an OFDM signal (e.g., the OFDM signal 510 in FIG. 5) is received at an ICI cancellation circuit (e.g., the ICI cancellation circuit 502 in FIG. 5) associated with an OFDM receiver. The method 600 is explained herein with reference to a single OFDM symbol associated with the OFDM signal. However, in other embodiments, the method 600 can be applied to one or more OFDM symbols associated with the OFDM signal.

At 604, an ICI associated with one or more OFDM subcarriers associated with the OFDM symbol is determined at the ICI cancellation circuit. In some embodiments, the ICI is determined at the ICI cancellation circuit, in accordance with a predetermined ICI mitigation algorithm (e.g., the ICI mitigation algorithm 300 in FIG. 3). At 606, the determined ICI is cancelled from the one or more OFDM subcarriers at the ICI cancellation circuit, in accordance with the predetermined ICI mitigation algorithm. In some embodiments, in order to determine the ICI at the ICI cancellation circuit (as indicated in 604 above), one or more ICI coefficients associated with the one or more OFDM subcarriers of the OFDM symbol is determined at an ICI coefficient determination circuit (e.g., the ICI coefficient determination circuit 502a in FIG. 5) associated with the ICI cancellation circuit, based on the received OFDM symbol, in accordance with a predetermined ICI coefficient relation (e.g. the predetermined ICI coefficient relation in equation (23) or equation (25) above).

In order to determine the one or more ICI coefficients, in some embodiments, a set of good pilot subcarriers is determined from a plurality of pilot subcarriers associated with the OFDM symbol, at the ICI coefficient determination circuit (as explained at 304 in the ICI mitigation algorithm 300 in FIG. 3 above). Further, in some embodiments, one or more pilot ICI kernel parameters for each of the selected good pilot subcarriers associated with the OFDM symbol is determined at the ICI coefficient determination circuit, in accordance with a predetermined pilot ICI kernel relation (as explained at 306 in the ICI mitigation algorithm 300 in FIG. 3 above). Furthermore, in some embodiments, a pilot ICI value for each of the selected good pilot subcarriers associated with the OFDM symbol is determined at the ICI coefficient determination circuit, based on information of a common phase error (CPE), phase error gradient (PEG), a channel estimate and pilot modulation associated with the OFDM symbol, in accordance with a predetermined pilot ICI relation (as explained at 308 in the ICI mitigation algorithm 300 in FIG. 3 above). Upon determining the pilot ICI kernels and the pilot ICI, one or more ICI coefficients associated with the one or more OFDM subcarriers of the OFDM symbol is determined at an ICI coefficient determination circuit (as explained at 310 in the ICI mitigation algorithm 300 in FIG. 3 above).

Further, in some embodiments, in order to determine the ICI at the ICI cancellation circuit (as indicated in 604 above), one or more ICI kernels associated with the one or more OFDM subcarriers of the OFDM symbol is determined at an ICI kernel estimation circuit (e.g., the ICI kernel estimation circuit 502b in FIG. 5) associated with the ICI cancellation circuit, based on the received OFDM symbol, in accordance with a predetermined ICI kernel relation (as explained at 314 in the ICI mitigation algorithm 300 in FIG. 3 above). In order to determine the one or more ICI kernels, in some embodiments, a viable subcarrier set to be utilized to determine the one or more ICI kernels is determined from neighboring subcarriers for each of the one or more OFDM subcarriers at the ICI kernel estimation circuit, prior to determining the one or more ICI kernels associated with the respective OFDM subcarriers (as explained at 312 in the ICI mitigation algorithm 300 in FIG. 3 above). Upon determining the one or more ICI coefficients and the one or more ICI kernels, the ICI associated with the one or more OFDM subcarriers is determined at the cancellation circuit (e.g., the cancellation circuit 502c in FIG. 5), in accordance with a predetermined ICI cancellation relation (e.g., the predetermined ICI cancellation relation in equation (26) above). Further, the determined ICI is cancelled from the OFDM symbol at the cancellation circuit, in accordance with the predetermined ICI cancellation relation (as indicated in 606 above).

While the methods are illustrated, and described above as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the disclosure herein. Also, one or more of the acts depicted herein may be carried out in one or more separate acts and/or phases.

While the invention has been illustrated and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention.

The foregoing description of one or more implementations provides illustration and description, but is not intended to be exhaustive or to limit the scope of the example embodiments to the precise form disclosed. Modifications and variations are possible in light of the above teachings or may be acquired from practice of various implementations of the example embodiments.

In the present disclosure like reference numerals are used to refer to like elements throughout, and wherein the illustrated structures and devices are not necessarily drawn to scale. As utilized herein, terms "module", "component," "system," "circuit," "circuitry," "element," "slice," and the like are intended to refer to a computer-related entity, hardware, software (e.g., in execution), and/or firmware. For example, circuitry or a similar term can be a processor, a process running on a processor, a controller, an object, an executable program, a storage device, and/or a computer with a processing device. By way of illustration, an application running on a server and the server can also be circuitry. One or more circuitries can reside within a process, and circuitry can be localized on one computer and/or distributed between two or more computers. A set of elements or a set of other circuitry can be described herein, in which the term "set" can be interpreted as "one or more."

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the disclosure. In addition, while a particular feature may have been disclosed with respect to only one of several implementations, such feature may be combined with one or more other features of the other implementations as may be desired and advantageous for any given or particular application.

Examples can include subject matter such as a method, means for performing acts or blocks of the method, at least one machine-readable medium including instructions that, when performed by a machine cause the machine to perform acts of the method or of an apparatus or system for concurrent communication using multiple communication technologies according to embodiments and examples described herein.

Example 1 is an inter-carrier interference (ICI) mitigation circuit associated with an orthogonal frequency division multiplexing (OFDM) receiver, comprising an ICI cancellation circuit configured to receive an OFDM symbol associated with an OFDM signal; determine an ICI associated with one or more OFDM subcarriers within the OFDM symbol; and cancel the ICI from the one or more OFDM subcarriers associated with the OFDM symbol, in order to generate a desired OFDM symbol, wherein the ICI is determined and cancelled in accordance with a predetermined ICI mitigation algorithm.

Example 2 is a circuit, including the subject matter of example 1, wherein the ICI cancellation circuit comprises an ICI coefficient determination circuit configured to receive the OFDM symbol and determine one or more ICI coefficients associated with the one or more OFDM subcarriers of the OFDM symbol, in accordance with a predetermined ICI coefficient relation, in order to determine the ICI.

Example 3 is a circuit, including the subject matter of examples 1-2, including or omitting elements, wherein the ICI cancellation circuit further comprises an ICI kernel estimation circuit configured to receive the OFDM symbol and determine one or more ICI kernels respectively associated with the one or more OFDM subcarriers of the OFDM symbol, in accordance with a predetermined ICI kernel relation, in order to determine the ICI.

Example 4 is a circuit, including the subject matter of examples 1-3, including or omitting elements, wherein the ICI cancellation circuit further comprises a cancellation circuit configured to receive the OFDM symbol, receive the one or more ICI coefficients from the ICI coefficient determination circuit and receive the one or more ICI kernels from ICI kernel estimation circuit; determine the ICI respectively associated with the one or more OFDM subcarriers, based on the received ICI coefficients and the ICI kernels; and cancel the determined ICI from the respective OFDM subcarriers of the one or more OFDM subcarriers, wherein the ICI is determined and cancelled based on a predetermined ICI cancellation relation.

Example 5 is a circuit, including the subject matter of examples 1-4, including or omitting elements, wherein the one or more ICI coefficients comprises a first ICI coefficient in a first instance, and wherein the one or more ICI coefficients comprises the first ICI coefficient and a second, different ICI coefficient in a second, different instance.

Example 6 is a circuit, including the subject matter of examples 1-5, including or omitting elements, wherein the one or more ICI kernels comprises a first ICI kernel in a first instance, and wherein the one or more ICI kernels comprises the first ICI kernel and a second, different ICI kernel in the second, different instance.

Example 7 is a circuit, including the subject matter of examples 1-6, including or omitting elements, wherein the ICI coefficient estimation circuit is further configured to select a set of good pilot subcarriers from a plurality of pilot subcarriers associated with the OFDM symbol; and determine one or more pilot ICI kernel parameters for each of the selected good pilot subcarriers associated with the OFDM symbol, in accordance with a predetermined pilot ICI kernel relation; and determine a pilot ICI value for each of the selected good pilot subcarriers associated with the OFDM symbol, based on information of a common phase error (CPE), phase error gradient (PEG), a channel estimate and pilot modulation associated with the OFDM symbol, in accordance with a predetermined pilot ICI relation, in order to implement the predetermined ICI coefficient relation to determine the one or more ICI coefficients.

Example 8 is a circuit, including the subject matter of examples 1-7, including or omitting elements, wherein the ICI kernel estimation circuit is further configured to select a viable subcarrier set from neighboring subcarriers for each of the one or more OFDM subcarriers to be utilized to determine the one or more ICI kernels, prior to determining the one or more ICI kernels associated with the respective OFDM subcarriers.

Example 9 is a circuit, including the subject matter of examples 1-8, including or omitting elements, further comprising a signal-to-noise ratio (SNR) estimation circuit coupled to the ICI cancellation circuit and configured to receive the OFDM symbol; determine SNR values associated with the plurality of pilot subcarriers of the OFDM symbol; and provide the determined SNR values to the ICI coefficient estimation circuit associated with the ICI cancellation circuit, in order to determine the set of good pilot subcarriers within the ICI coefficient estimation circuit.

Example 10 is a circuit, including the subject matter of examples 1-9, including or omitting elements, further comprising a channel estimation circuit coupled to the ICI cancellation circuit and configured to determine a channel estimate associated with the OFDM symbol; and provide the channel estimate to the ICI coefficient estimation circuit associated with the ICI cancellation circuit, in order to determine the pilot ICI value.

Example 11 is a circuit, including the subject matter of examples 1-10, including or omitting elements, further comprising a phase analysis circuit coupled to the ICI cancellation circuit and configured to receive the OFDM symbol; determine the CPE and the PEG associated with the OFDM symbol; and provide the CPE and the PEG to the ICI coefficient estimation circuit associated with the ICI cancellation circuit, in order to determine the pilot ICI value.

Example 12 is an inter-carrier interference (ICI) cancellation circuit associated with an orthogonal frequency division multiplexing (OFDM) receiver, configured to receive an OFDM symbol associated with an OFDM signal; determine an ICI associated with one or more OFDM subcarriers within the OFDM symbol; and cancel the ICI from the one or more OFDM subcarriers associated with the OFDM symbol, in order to generate a desired OFDM symbol, wherein the ICI is determined and cancelled in accordance with a predetermined ICI mitigation algorithm.

Example 13 is a circuit, including the subject matter of example 12, comprises an ICI coefficient determination circuit configured to receive the OFDM symbol and determine one or more ICI coefficients associated with the one or more OFDM subcarriers of the OFDM symbol, in accordance with a predetermined ICI coefficient relation, in order to determine the ICI.

Example 14 is a circuit, including the subject matter of examples 12-13, including or omitting elements, further comprises an ICI kernel estimation circuit configured to receive the OFDM symbol and determine one or more ICI kernels respectively associated with the one or more OFDM subcarriers of the OFDM symbol, in accordance with a predetermined ICI kernel relation, in order to determine the ICI.

Example 15 is a circuit, including the subject matter of examples 12-14, including or omitting elements, further comprises a cancellation circuit configured to receive the OFDM symbol, receive the one or more ICI coefficients from the ICI coefficient determination circuit and receive the one or more ICI kernels from ICI kernel estimation circuit; determine the ICI respectively associated with the one or more OFDM subcarriers, based on the received ICI coefficients and the ICI kernels; and cancel the determined ICI from the respective OFDM subcarriers of the one or more OFDM subcarriers associated with the OFDM symbol, based on a predetermined ICI cancellation relation.

Example 16 is a circuit, including the subject matter of examples 12-15, including or omitting elements, wherein the ICI coefficient determination circuit is further configured to determine a set of good pilot subcarriers from a plurality of pilot subcarriers associated with the OFDM symbol; determine one or more pilot ICI kernel parameters for each of the selected good pilot subcarriers associated with the OFDM symbol, in accordance with a predetermined pilot ICI kernel relation; and determine a pilot ICI value for each of the selected good pilot subcarriers associated with the OFDM symbol, based on information of a common phase error (CPE), phase error gradient (PEG), a channel estimate and pilot modulation associated with the OFDM symbol, in accordance with a predetermined pilot ICI relation, in order to implement the predetermined ICI coefficient relation to determine the one or more ICI coefficients.

Example 17 is a circuit, including the subject matter of examples 12-16, including or omitting elements, wherein the ICI kernel estimation circuit is further configured to determine a viable subcarrier set from neighboring subcarriers for each of the one or more OFDM subcarriers to be utilized to determine the one or more ICI kernels, prior to determining the one or more ICI kernels associated with the respective OFDM subcarriers.

Example 18 is a circuit, including the subject matter of examples 12-17, including or omitting elements, wherein the OFDM symbol comprises one or more OFDM symbols associated with the OFDM signal and wherein the ICI cancellation circuit is configured to determine the ICI associated with one or more OFDM subcarriers associated with the one or more OFDM symbols and cancel the ICI from the one or more OFDM subcarriers respectively associated with the one or more OFDM symbols.

Example 19 is a method for cancelling an inter-carrier interference (ICI) in an orthogonal frequency division multiplexing (OFDM) receiver, comprising receiving, at an ICI cancellation circuit associated with the OFDM receiver, an OFDM symbol associated with an OFDM signal; determining, at the ICI cancellation circuit, an ICI associated with one or more OFDM subcarriers within the OFDM symbol; and cancelling, at the ICI cancellation circuit, the ICI from the one or more OFDM subcarriers associated with the OFDM symbol, in order to generate a desired OFDM symbol, wherein the ICI is determined and cancelled in accordance with a predetermined ICI mitigation algorithm.

Example 20 is a method, including the subject matter of example 19, wherein determining the ICI at the ICI cancellation circuit comprises receiving the OFDM symbol and determining one or more ICI coefficients associated with the one or more OFDM subcarriers of the OFDM symbol, in accordance with a predetermined ICI coefficient relation, at an ICI coefficient determination circuit associated with the ICI cancellation circuit; receiving the OFDM symbol and determining one or more ICI kernels associated with the one or more OFDM subcarriers of the OFDM symbol, in accordance with a predetermined ICI coefficient relation, at an ICI kernel estimation circuit associated with the ICI cancellation circuit; and determining ICI associated with the one or more OFDM subcarriers of the OFDM symbol, at a cancellation circuit associated with the ICI cancellation circuit, based on the one or more ICI coefficients and the one or more ICI kernels.

Example 21 is a method, including the subject matter of examples 19-20, including or omitting elements, wherein cancelling the determined ICI at the ICI cancellation circuit comprises, cancelling the determined ICI from the one or more OFDM subcarriers associated with the OFDM symbol, at the cancellation circuit, in accordance with a predetermined ICI cancellation relation.

Example 22 is a method, including the subject matter of examples 19-21, including or omitting elements, further comprising determining, at the ICI coefficient determination circuit a set of good pilot subcarriers from a plurality of pilot subcarriers associated with the OFDM symbol; one or more pilot ICI kernel parameters for each of the selected good pilot subcarriers associated with the OFDM symbol, in accordance with a predetermined pilot ICI kernel relation; and a pilot ICI value for each of the selected good pilot subcarriers associated with the OFDM symbol, based on information of a common phase error (CPE), phase error gradient (PEG), a channel estimate and pilot modulation associated with the OFDM symbol, in accordance with a predetermined pilot ICI relation, prior to determining the one or more ICI coefficients, in order to determine the one or more ICI coefficients.

Example 23 is a method, including the subject matter of examples 19-22, including or omitting elements, further comprising determining, at the ICI kernel estimation circuit, a viable subcarrier set from neighboring subcarriers for each of the one or more OFDM subcarriers to be utilized to determine the one or more ICI kernels, prior to determining the one or more ICI kernels associated with the respective OFDM subcarriers.

Various illustrative logics, logical blocks, modules, and circuits described in connection with aspects disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform functions described herein. A general-purpose processor can be a microprocessor, but, in the alternative, processor can be any conventional processor, controller, microcontroller, or state machine.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the disclosure. In addition, while a particular feature may have been disclosed with respect to only one of several implementations, such feature may be combined with one or more other features of the other implementations as may be desired and advantageous for any given or particular application.

What is claimed is:

1. An inter-carrier interference (ICI) mitigation circuit associated with an orthogonal frequency division multiplexing (OFDM) receiver, comprising:
an ICI cancellation circuit configured to:
receive an OFDM symbol associated with an OFDM signal;
determine an ICI associated with one or more OFDM subcarriers within the OFDM symbol, wherein the ICI associated with an OFDM subcarrier is determined based on a relation between one or more ICI coefficients and one or more ICI kernels associated with the respective OFDM subcarrier; and
cancel the ICI from the one or more OFDM subcarriers associated with the OFDM symbol, in order to generate a desired OFDM symbol, wherein the ICI is determined and cancelled in accordance with a predetermined ICI mitigation algorithm.

2. The circuit of claim 1, wherein the ICI cancellation circuit comprises an ICI coefficient determination circuit configured to receive the OFDM symbol and determine the one or more ICI coefficients associated with the one or more OFDM subcarriers of the OFDM symbol, in accordance with a predetermined ICI coefficient relation, in order to determine the ICI associated with the one or more subcarriers.

3. The circuit of claim 2, wherein the ICI cancellation circuit further comprises an ICI kernel estimation circuit configured to receive the OFDM symbol and determine the one or more ICI kernels associated with the one or more OFDM subcarriers of the OFDM symbol, in accordance with a predetermined ICI kernel relation, in order to determine the ICI associated with the one or more OFDM subcarriers.

4. The circuit of claim 3, wherein the ICI cancellation circuit further comprises a cancellation circuit configured to:

receive the OFDM symbol, receive the one or more ICI coefficients from the ICI coefficient determination circuit and receive the one or more ICI kernels from ICI kernel estimation circuit;

determine the ICI respectively associated with the one or more OFDM subcarriers, based on the received ICI coefficients and the ICI kernels; and cancel the determined ICI from the respective OFDM subcarriers of the one or more OFDM subcarriers, wherein the ICI is determined and cancelled based on a predetermined ICI cancellation relation.

5. The circuit of claim 2, wherein the one or more ICI coefficients comprises a first ICI coefficient in a first instance, and wherein the one or more ICI coefficients comprises the first ICI coefficient and a second, different ICI coefficient in a second, different instance.

6. The circuit of claim 3, wherein the one or more ICI kernels comprises a first ICI kernel in a first instance, and wherein the one or more ICI kernels comprises the first ICI kernel and a second, different ICI kernel in the second, different instance.

7. The circuit of claim 2, wherein the ICI coefficient determination circuit is further configured to:

select a set of good pilot subcarriers from a plurality of pilot subcarriers associated with the OFDM symbol;

determine one or more pilot ICI kernel parameters for each of the selected good pilot subcarriers associated with the OFDM symbol, in accordance with a predetermined pilot ICI kernel relation; and determine a pilot ICI value for each of the selected good pilot subcarriers associated with the OFDM symbol, based on information of a common phase error (CPE), phase error gradient (PEG), a channel estimate and pilot modulation associated with the OFDM symbol, in accordance with a predetermined pilot ICI relation, in order to implement the predetermined ICI coefficient relation to determine the one or more ICI coefficients.

8. The circuit of claim 3, wherein the ICI kernel estimation circuit is further configured to select a viable subcarrier set from neighboring subcarriers for each of the one or more OFDM subcarriers to be utilized to determine the one or more ICI kernels, prior to determining the one or more ICI kernels associated with the respective OFDM subcarriers.

9. The circuit of claim 7, further comprising a signal-to-noise ratio (SNR) estimation circuit coupled to the ICI cancellation circuit and configured to:

receive the OFDM symbol;

determine SNR values associated with the plurality of pilot subcarriers of the OFDM symbol; and provide the determined SNR values to the ICI coefficient estimation circuit associated with the ICI cancellation circuit, in order to determine the set of good pilot subcarriers within the ICI coefficient estimation circuit.

10. The circuit of claim 7, further comprising a channel estimation circuit coupled to the ICI cancellation circuit and configured to:

determine a channel estimate associated with the OFDM symbol; and provide the channel estimate to the ICI coefficient estimation circuit associated with the ICI cancellation circuit, in order to determine the pilot ICI value.

11. The circuit of claim 7, further comprising a phase analysis circuit coupled to the ICI cancellation circuit and configured to:

receive the OFDM symbol;

determine the CPE and the PEG associated with the OFDM symbol; and provide the CPE and the PEG to the ICI coefficient estimation circuit associated with the ICI cancellation circuit, in order to determine the pilot ICI value.

12. An inter-carrier interference (ICI) cancellation circuit associated with an orthogonal frequency division multiplexing (OFDM) receiver, configured to:

receive an OFDM symbol associated with an OFDM signal;

determine an ICI associated with one or more OFDM subcarriers within the OFDM symbol, wherein the ICI associated with an OFDM subcarrier is determined based on a relation between one or more ICI coefficients and one or more ICI kernels associated with the respective OFDM subcarrier; and cancel the ICI from the one or more OFDM subcarriers associated with the OFDM symbol, in order to generate a desired OFDM symbol, wherein the ICI is determined and cancelled in accordance with a predetermined ICI mitigation algorithm.

13. The circuit of claim 12, comprises an ICI coefficient determination circuit configured to receive the OFDM symbol and determine the one or more ICI coefficients associated with the one or more OFDM subcarriers of the OFDM symbol, in accordance with a predetermined ICI coefficient relation, in order to determine the ICI associated with the one or more OFDM subcarriers.

14. The circuit of claim 13, further comprises an ICI kernel estimation circuit configured to receive the OFDM symbol and determine the one or more ICI kernels associated with the one or more OFDM subcarriers of the OFDM symbol, in accordance with a predetermined ICI kernel relation, in order to determine the ICI associated with the one or more OFDM subcarriers.

15. The circuit of claim 14, further comprises a cancellation circuit configured to:

receive the OFDM symbol, receive the one or more ICI coefficients from the ICI coefficient determination circuit and receive the one or more ICI kernels from ICI kernel estimation circuit;

determine the ICI respectively associated with the one or more OFDM subcarriers, based on the received ICI coefficients and the ICI kernels; and cancel the determined ICI from the respective OFDM subcarriers of the one or more OFDM subcarriers associated with the OFDM symbol, based on a predetermined ICI cancellation relation.

16. The circuit of claim 13, wherein the ICI coefficient determination circuit is further configured to:

determine a set of good pilot subcarriers from a plurality of pilot subcarriers associated with the OFDM symbol;

determine one or more pilot ICI kernel parameters for each of the selected good pilot subcarriers associated with the OFDM symbol, in accordance with a predetermined pilot ICI kernel relation; and determine a pilot ICI value for each of the selected good pilot subcarriers associated with the OFDM symbol, based on information of a common phase error (CPE), phase error gradient (PEG), a channel estimate and pilot modulation associated with the OFDM symbol, in accordance with a predetermined pilot ICI relation, in order to implement the predetermined ICI coefficient relation to determine the one or more ICI coefficients.

17. The circuit of claim 14, wherein the ICI kernel estimation circuit is further configured to determine a viable subcarrier set from neighboring subcarriers for each of the one or more OFDM subcarriers to be utilized to determine the one or more ICI kernels, prior to determining the one or more ICI kernels associated with the respective OFDM subcarriers.

18. The circuit of claim 12, wherein the OFDM symbol comprises one or more OFDM symbols associated with the OFDM signal and wherein the ICI cancellation circuit is configured to determine the ICI associated with one or more OFDM subcarriers associated with the one or more OFDM symbols and cancel the ICI from the one or more OFDM subcarriers respectively associated with the one or more OFDM symbols.

19. A method for cancelling an inter-carrier interference (ICI) in an orthogonal frequency division multiplexing (OFDM) receiver, comprising:
  receiving, at an ICI cancellation circuit associated with the OFDM receiver, an OFDM symbol associated with an OFDM signal;
  determining, at the ICI cancellation circuit, an ICI associated with one or more OFDM subcarriers within the OFDM symbol, wherein the ICI associated with an OFDM subcarrier is determined based on a relation between one or more ICI coefficients and one or more ICI kernels associated with the respective OFDM subcarrier; and
  cancelling, at the ICI cancellation circuit, the ICI from the one or more OFDM subcarriers associated with the OFDM symbol, in order to generate a desired OFDM symbol, wherein the ICI is determined and cancelled in accordance with a predetermined ICI mitigation algorithm.

20. The method of claim 19, wherein determining the ICI at the ICI cancellation circuit comprises:
  receiving the OFDM symbol and determining the one or more ICI coefficients associated with the one or more OFDM subcarriers of the OFDM symbol, in accordance with a predetermined ICI coefficient relation, at an ICI coefficient determination circuit associated with the ICI cancellation circuit;
  receiving the OFDM symbol and determining the one or more ICI kernels associated with the one or more OFDM subcarriers of the OFDM symbol, in accordance with a predetermined ICI coefficient relation, at an ICI kernel estimation circuit associated with the ICI cancellation circuit; and
  determining ICI associated with the one or more OFDM subcarriers of the OFDM symbol, at a cancellation circuit associated with the ICI cancellation circuit, based on the one or more ICI coefficients and the one or more ICI kernels.

21. The method of claim 20, wherein cancelling the determined ICI at the ICI cancellation circuit comprises, cancelling the determined ICI from the one or more OFDM subcarriers associated with the OFDM symbol, at the cancellation circuit, in accordance with a predetermined ICI cancellation relation.

22. The method of claim 20, further comprising determining, at the ICI coefficient determination circuit:
  a set of good pilot subcarriers from a plurality of pilot subcarriers associated with the OFDM symbol;
  one or more pilot ICI kernel parameters for each of the selected good pilot subcarriers associated with the OFDM symbol, in accordance with a predetermined pilot ICI kernel relation; and
  a pilot ICI value for each of the selected good pilot subcarriers associated with the OFDM symbol, based on information of a common phase error (CPE), phase error gradient (PEG), a channel estimate and pilot modulation associated with the OFDM symbol, in accordance with a predetermined pilot ICI relation, prior to determining the one or more ICI coefficients, in order to determine the one or more ICI coefficients.

23. The method of claim 20, further comprising determining, at the ICI kernel estimation circuit, a viable subcarrier set from neighboring subcarriers for each of the one or more OFDM subcarriers to be utilized to determine the one or more ICI kernels, prior to determining the one or more ICI kernels associated with the respective OFDM subcarriers.

* * * * *